May 13, 1941.    A. EPPLER, JR    2,241,506

PIVOTAL JOINT

Filed Jan. 31, 1940

INVENTOR
Andrew Eppler, Jr.
By his Attorney

Patented May 13, 1941

2,241,506

UNITED STATES PATENT OFFICE 2,241,506

PIVOTAL JOINT

Andrew Eppler, Jr., Lynn, Mass., assignor to United Shoe Machinery Corporation, Borough of Flemington, N. J., a corporation of New Jersey Application January 31, 1940, Serial No. 316,647

7 Claims. (Cl. 287—14)

This invention relates to pivotal joints and is illustrated as providing an operating connection between two relatively movable members and embodying improved features that automatically counteract imperfections of machining and wear of the parts to prevent lost motion without impairing their operation.

In accordance with the illustrated examples embodying the invention, the members to be connected with provisions for relative angular movement have co-axial sockets of frusto-conical form the smaller ends of which are adjacent to each other. A connecting pivot extending through these sockets has a frusto-conical head and a cylindrical stem, the head being seated on the internal frusto-conical surface in one of the members and the stem extending through, but not engaging, the other member. A bushing telescopically related to the pivot has a cylindrical bore and a frusto-conical external surface that engage, respectively, the stem and the frusto-conical internal surface in the other member. Moreover, the bushing has clefts that enable it to be contracted against the stem to take up internal clearance, such contraction being the result of a moderate force by which the bushing is held against the internal surface of its socket member.

To complete the assemblage, a compression spring is arranged on the outer end of the stem to bear against the larger end of the bushing, and a keeper is secured to the stem to maintain the spring under compression. Consequently, the force of the spring is exerted in one direction against the stem and in the opposite direction against the bushing, the connected members being thereby maintained in contact with each other, the head of the pivot being maintained firmly against the internal frusto-conical surface in one of the socket members, the bushing being maintained firmly against the internal frusto-conical surface in the other one of the socket members, and the bushing being contracted sufficiently to take up wear and prevent lost motion between it and the stem. The same force also maintains contact of the socket members, one with the other. Thus, the parts are so formed and related that a single spring is rendered effective to prevent looseness between four pairs of cooperative bearing surfaces not only when the parts are first assembled but continuously thereafter as they may become worn in consequence of operation.

These and other features of the invention will now be described with reference to the accompanying drawing and pointed out in the appended claims.

Figure 1:
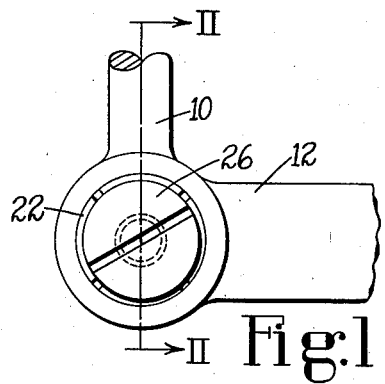
Fig. 1 is an elevation of a typical example of a pivotal connection embodying this invention.

Two members to be pivotally connected together, such as a link and a lever or two links, are represented by the reference characters 10 and 12. These members have confronting bearing faces and are provided with sockets having frusto-conical surfaces 14 and 16, the smaller ends of which are toward each other and intersect the bearing faces. Extending through the sockets is a connecting pivot comprising a cylindrical stem 18 and a head having a frusto-conical surface 20 complemental to the surface 14 and seated thereagainst. The stem 18 of the pivot extends through and beyond a steel bushing 22 telescopically combined therewith, the bushing having a cylindrical internal surface fitted to the stem and a frusto-conical external surface fitted to and seated against the corresponding surface 16 in the member 12. A space between the smaller ends of the bushing and the head of the connecting pivot provides for telescopic movement of these members to take up all loose play of the assembled parts.

The outer end of the stem is internally threaded to receive a keeper such as a screw 24 having a head 26 forming an abutment for the outer end of a compression spring 28. The other end of the spring 28 bears against the larger end of the bushing. The bushing and the head of the connecting pivot are therefore effective to maintain face-to-face contact of the members 10 and 12.

Figure 2:
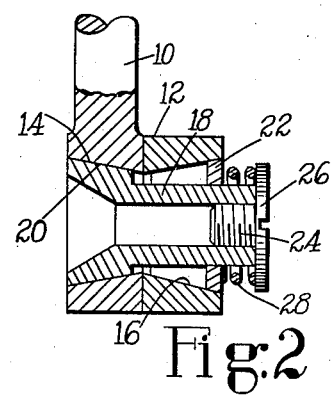
Fig. 2 is a sectional view taken on the line II—II of Fig. 1.
Figure 3:
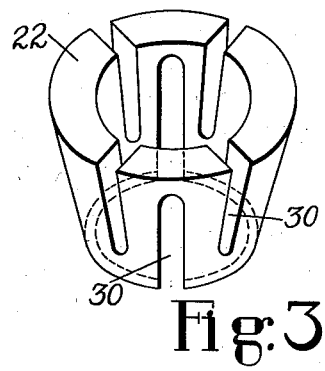
Fig. 3 is a view showing one form of bushing that may be employed in the pivotal connection.
Figure 4:
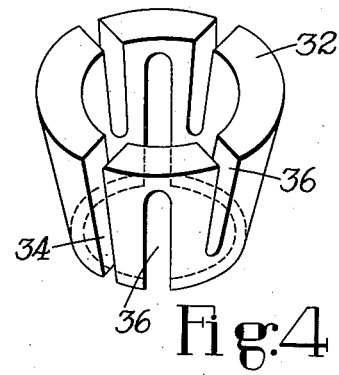
Figs. 4 and 5 are views showing modified forms of bushings which may be employed in place of the bushing shown in Fig. 3.

In order to take up wear between the bushing and the cylindrical stem 18 of the connecting pivot, the bushing is so made as to be contracted by the force of the spring 28 and the tapering form of the surface 16. For this purpose the bushing 22 shown in Figs. 1, 2, and 3 is divided into segments by clefts 30 that render it radially elastic. Four alternate clefts divide one end of the bushing and four others divide the other end. The resistance to contracting force may be reduced by extending one of the clefts (see cleft 34 in Fig. 4) to both ends of the bushing without sacrificing unity of the bushing. In this modification the bushing 32 is divided into segments not only by the full-length cleft 34 but also by shorter clefts 36 similar to the clefts 30.

Figure 5:
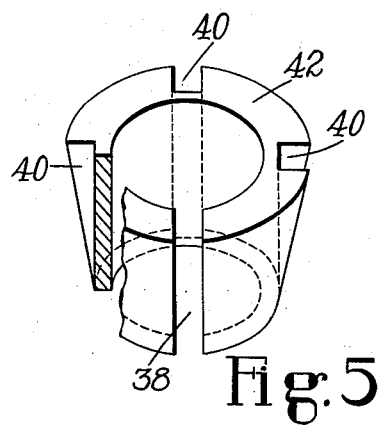

The bushing 42 illustrated in Fig. 5 is rendered resilient by a plurality of full-length clefts one of which is a through-and-through cleft 38 and the others in the form of grooves 40.

Any of the bushings illustrated may be utilized in the connection of Fig. 1 and it should be understood that other forms of bushings with any suitable provisions for permitting the contraction thereof may be utilized.

It will now be understood that the action of the spring 28 in urging the head of the connecting pivot and the bushing toward each other eliminates all loose play that might otherwise take place between any of the contiguous bearing surfaces. Thus, any wear that takes place between the members 10 and 12, between the member 10 and the head 20, between the member 12 and the bushing 22, and between the bushing 22 and the stem 18, will be automatically taken up by telescopic movement of the pivot member and the bushing and the resultant contraction of the bushing.

Having described my invention what I claim as new and desire to secure by Letters Patent in the United States is:

1. A pivotal joint comprising two lapped members having confronting bearing faces seated one against the other and registering frusto-conical sockets the smaller ends of which intersect said bearing faces, two telescopically related members having frusto-conical external surfaces seated in said sockets respectively and spaced one from the other to provide a take-up gap, and means arranged to act in opposite directions on said telescopically related members to take up loose play between them and the lapped members.

2. A pivotal joint comprising two lapped members having frusto-conical sockets the smaller ends of which are toward each other, a connecting pivot having an external frusto-conical surface seated in the socket in one of said members and a cylindrical stem passing through the socket in the other of said members and out of engagement therewith, a bushing having a cylindrical internal surface seated on said cylindrical stem and having a frusto-conical external surface seated in the socket of the other of said members, a keeper on the outer end of said stem, and a compression spring between said bushing and said keeper for urging said bushing and said pivot in opposite directions to take up loose play between said lapped members and the parts connecting them.

3. A pivotal joint comprising two relatively movable members having coaxial frusto-conical sockets, the smaller ends thereof being disposed toward each other, a connecting pivot for said members, said pivot including a head having an external frusto-conical surface seated in the socket in one of said members and a cylindrical stem extending through but out of contact with the socket in the other of said members, a bushing having an internal cylindrical surface seated on said stem and having a frusto-conical external surface seated in the socket in the other of said members, said head and said bushing terminating short of the smaller ends of the holes in said relatively movable members, and resilient means arranged to stress said pivot and said bushing in opposite directions to take up loose play between said head and bushing and said relatively movable members.

4. A pivotal joint comprising two lapped members having registering frusto-conical sockets the smaller ends of which are toward each other, a connecting pivot and a bushing telescopically related, and a spring arranged to stress said pivot and said bushing in opposite directions to maintain said lapped members one against the other, said pivot having a frusto-conical head seated in one of said sockets, and said bushing having a frusto-conical outer surface seated in the other one of said sockets, said bushing also having a plurality of clefts by which it is rendered capable of being contracted radially against said pivot by the force of said spring and the wedging effect of the frusto-conical socket in which the bushing is seated.

5. A pivotal joint comprising two lapped members having registering frusto-conical sockets the smaller ends of which are toward each other, a connecting pivot and a bushing telescopically related, and a spring arranged to stress said pivot and said bushing in opposite directions to maintain said lapped members one against the other, said pivot having a frusto-conical head seated in one of said sockets, and said bushing having a frusto-conical outer surface seated in the other one of said sockets, said bushing also having a plurality of clefts by which it is rendered capable of being contracted radially against said pivot by the force of said spring and the wedging effect of the frusto-conical socket in which the bushing is seated, at least one of said clefts extending entirely through the bushing from end to end.

6. A pivotal joint comprising two lapped members having registering frusto-conical sockets the smaller ends of which are toward each other, a connecting pivot and a bushing telescopically related, and a spring arranged to stress said pivot and said bushing in opposite directions to maintain said lapped members one against the other, said pivot having a frusto-conical head seated in one of said sockets, and said bushing having a frusto-conical outer surface seated in the other one of said sockets, said bushing also having a plurality of clefts by which it is rendered capable of being contracted radially against said pivot by the force of said spring and the wedging effect of the frusto-conical socket in which the bushing is seated, alternate clefts starting at opposite ends of the bushing and terminating short of the other ends thereof.

7. A pivotal joint comprising two lapped members having registering frusto-conical sockets the smaller ends of which are toward each other, a connecting pivot and a bushing telescopically related, and a spring arranged to stress said pivot and said bushing in opposite directions to maintain said lapped members one against the other, said pivot having a frusto-conical head seated in one of said sockets, and said bushing having a frusto-conical outer surface seated in the other one of said sockets, said bushing also having a plurality of clefts by which it is rendered capable of being contracted radially against said pivot by the force of said spring and the wedging effect of the frusto-conical socket in which the bushing is seated, said clefts being in the form of longitudinal grooves in the outer surface of the bushing.

ANDREW EPPLER, Jr.